United States Patent Office 2,926,082
Patented Feb. 23, 1960

2,926,082
PRODUCTION OF THORIUM

Thomas P. Whaley, Baton Rouge, La., assignor to Ethyl Corporation, New York, N.Y., a corporation of Delaware No Drawing. Application November 27, 1956
Serial No. 624,501
3 Claims. (Cl. 75—84.1)

This invention is concerned with the manufacture of thorium and more particularly to a new and improved process for producing high purity thorium from economical raw materials and reagents.

Thorium is finding increased usage particularly in the formation of alloys, and as an electrode material. For example, the magnesium-thorium alloy system wherein the quantity of thorium is between about 5 to 50 percent is an alloy of increased strength and good creep resistance. Thorium's use as an electrode in lamps of the gaseous discharge type is advantageous in that a lower starting potential and more uniform operating characteristics are exhibited than obtained with oxide coated electrodes previously employed.

Considerable effort has been expended in recent years toward developing a commercially feasible process for the manufacture of this valuable product. However, none of the processes proposed to date is capable of producing this metal economically enough to open up a potentially large usage. The principal method of production of thorium is by the reaction of its oxide with calcium. This method does produce high quality product but is not used commercially chiefly because of the high cost of the calcium metal. It has also been proposed to produce numerous such metals including zirconium, uranium and thorium by reducing the metallic oxide by the combined action of an alkali metal and an alkaline earth halide. In particular, the reaction of zirconium dioxide with barium chloride and sodium is specifically described. Likewise some attempts have been made for producing thorium by reacting its oxide with calcium chloride and sodium. This technique has however been rejected because of the difficulties encountered by the investigators and the low purity material obtained.

It is of considerable importance that thorium be of very high purity, i.e., greater than 99 percent. It is recognized that the stability of thorium metal with respect to oxidation is a function of the oxide content of the metal in addition to its surface condition. This is demonstrated by the fact that when the oxide content of thorium is one percent by weight and higher the metal tarnishes upon exposure to the atmosphere for even short periods of time. This feature results in the necessity of extreme care when the metal contains more than one percent by weight of oxide.

An object of the present invention is to provide a new and improved process for the preparation of thorium particularly from its oxide. A further object is to produce high purity thorium from naturally occurring raw materials. A specific object is to provide an improved process for the production of this metal by reduction of its oxide with calcium, the calcium, however, being provided in situ from economical and abundant starting materials.

The discovery has now been made that metallic thorium of a purity greater than 99 percent by weight can be prepared by reacting thorium dioxide at an elevated temperature with calcium halide and alkali metal employing for every mole of thorium dioxide, at least 6 moles of calcium halide and at least 8 moles of alkali metal.

The process of the present invention can be thought of as taking place by means of the following equation:

$$2CaX_2 + 4M + ThO_2 \rightarrow Th + 2CaO + 4MX$$

where X is a halide and M is an alkali metal. Stated in another way, this invention comprises reducing thorium dioxide at an elevated temperature by reduction with calcium halide and alkali metal in proportions such that the calcium halide is at least 200 percent in excess and the amount of the alkali metal is at least 100 percent in excess in moles of the amounts required by the above equation. For more beneficial results in terms of product purity, that is to obtain thorium essentially 100 percent pure, it is preferable that the amount of the alkali metal be at least 200 percent in excess in moles of the amount required by the equation.

In terms of the above equation, one preferred embodiment of this invention comprises reacting thorium dioxide with at least 200 percent excess in moles of calcium chloride and with the weight ratio of the calcium chloride to sodium being not greater than about 4 to 1.

It has been found that use of these abundant raw materials and reagents consistently leads to the production of metallic thorium in purity of at least 99 percent and generally above 99.5 percent. In contrast when operating with amounts of the calcium halide and alkali metal less than the above stated amounts it is found that the purity of the product falls off sharply and in most instances is less than 90 percent.

The following examples will more completely illustrate the scope and benefits of this invention. In each instance, all parts and percentages are by weight.

Example I

A mixture of thorium dioxide, 44 parts, calcium chloride, 111 parts, and sodium, 31 parts, was heated in an electric furnace to a temperature of 900° C. under an argon atmosphere and maintained at this temperature for 30 minutes. Thus a 200 percent excess of the calcium chloride and a 100 percent excess in moles of the sodium was employed. The weight ratio of the calcium chloride to the sodium was about 3.6 to 1. At the end of this time the reaction mixture was cooled to room temperature, washed with alcohol to remove unreacted sodium, washed with dilute acid and water to remove soluble materials, and the residual product dried. This product was found to comprise thorium metal of 99.2 percent metal content.

Example II

The procedure of Example I was repeated with exception that the calcium chloride was 200 percent in excess and the sodium was 220 percent in excess in terms of the above equation. The product comprised thorium of 99.3 percent metal content.

The following example will demonstrate a particularly preferred embodiment of this invention in which essentially pure thorium is obtained.

Example III

The procedure of Example I was repeated with exception that the mixture was dehydrated at 400° C. and then reacted essentially as described above. In this instance the excess calcium chloride in moles was 250 percent and the excess sodium was 270 percent. Thorium was obtained in yield above 90 percent having a metal content of 100 percent.

In contrast to the results obtained above when the excess calcium chloride was 100 percent in moles and the excess of sodium was 120 percent it was found that the product thorium had only a 96.6 percent metal content. This product readily oxidized upon exposure to the atmosphere.

I have found that the temperatures at which the reactions of my invention should be carried out are not critical. Since it is preferred to have the calcium halide in the molten state, I generally employ a temperature permitting the melting of the calcium halide. Although pure calcium chloride melts at about 770° C., it is possible by the use of melting point depressants to maintain a fluid mixture at much lower temperatures than this. For example, the alkali metal halide formed in the reaction serves to lower the melting point of the calcium chloride to around 700° C., and other diluents chosen to form binary and ternary mixtures can be used to lower the melting point even further. Calcium bromide and calcium iodide have melting points lower than that of calcium chloride, while that of calcium fluoride is higher. I have found that production of thorium at an efficient rate occurs at temperatures above about 700° C., and that for best results it is preferable to use temperatures in the range of about 800 to 900° C. However, if means to maintain the sodium in the reaction zone, such as pressure equipment or reflux condensers, are employed, temperatures higher than these can be used. In general, the temperature employed can vary from about 700° C. to about 1000° C. Thus in any of the aforementioned examples similar results are obtained when the temperature of the reaction is 700, 750, 800, 850, 950 and 1000° C.

For best results it has been found that the reaction mixture should be maintained at reaction temperature for at least about 30 minutes and preferably from 1 to 4 hours. It is to be understood, however, that thorium is formed at reaction temperature in even shorter periods of time than this, although in lower yields.

It should be understood that the benefits of the present invention are obtained so long as the amounts of calcium halide and alkali metal are selected so as to be at least those amounts called for above. It is sometimes preferable to use amounts of both materials considerably in excess of the minimum amounts specified so that in effect an infinite excess of each of the reagents is present. Additional benefits to be obtained by such procedure include that of the use of the reagents as a flux. Thus, one can employ fluxing quantities of the reagents, that is more than about 400 mole percent. This is especially adaptable to continuous operation, but not limited thereto, in which the thorium dioxide is passed into a bath comprising the molten reagents and the thorium product continuously removed therefrom.

Many modifications and variations of the basic process of the invention will be evident to those skilled in the art. For example, the alkali metal used in the reaction can be formed in situ from a mixture of alkali metal halide and calcium halide by electrolysis in the molten state. Thorium dioxide can then be added at or near the cathode of the cell while still maintaining a local excess of the calcium halide and alkali metal. Also, additional calcium metal can be added over and above the amount of calcium halide used. One elegant way of accomplishing this addition is to use the sodium-calcium sludge formed in electrolysis of sodium chloride-calcium chloride mixtures for the production of metallic sodium.

The thorium dioxide chosen should be free of absorbed moisture, and the calcium halide should be essentially anhydrous and free of any water of hydration. Both these materials should be of small particle size for best results.

For best results it is helpful to use efficient agitation in the reaction vessel. To achieve the advantages of this process the ingredients are intimately mixed. This can be done by mechanical stirring, plunging, use of ball-mill type equipment, and the like, either prior to or during the reaction period.

The process of my invention is adaptable to continuous operation. For example, an intimate mixture of anhydrous calcium chloride and thorium dioxide can be dispersed in molten sodium at 100 to 150° C. contained in a mixing vessel, the molten sodium being also continuously fed. The intimate mixture of sodium, calcium chloride, and the thorium dioxide is then fed continuously, as by a screw or belt conveyor, into a reactor maintained at temperatures on the order of 800 to 900° C., at which temperature reaction to form the thorium proceeds. The high temperature portion of the reaction zone is adapted for the residence time desired. From the reaction chamber the product mixture is led continuously to a still maintained at about 900° C. in which unreacted sodium is distilled from the mixture, condensed, and returned to the initial mixing chamber. The remainder of the mixture is cooled to a temperature below 100° C. and washed with dilute acid and water to remove all components except the thorium. The thorium is then dried and stored for use.

In all modifications of the present invention it is important that the reaction be conducted in an atmosphere which is inert to the thorium. Since thorium reacts with oxygen, nitrogen, and hydrogen, particularly at elevated temperatures, and since in many cases such reaction results in the formation of a brittle form of the thorium, it is preferred to use gases of the rare gas series, such as argon, helium, neon, etc., for the blanketing.

Although the present invention has been illustrated chiefly with calcium chloride and sodium, it is to be understood that other calcium halides and other alkali metals, such as lithium, potassium, cesium, and rubidium, are equally applicable. Mixtures of calcium halides and mixtures of alkali metals can be used. Thus in the Examples I through III, lithium, potassium, rubidium, or cesium can be substituted for sodium; and calcium bromide, iodide, or fluoride can be substituted for calcium chloride to obtain similar results. It is preferred, however, to employ calcium chloride and sodium for economy. Furthermore, it is to be understood that mixed oxides of thorium such as thorianite, thorite, and the ore monazite can also be used although it is preferred to employ and obtain the thorium oxide from these ores by purification techniques.

Having thus described the process of this invention it is not intended that it be limited except as set forth in the following claims.

I claim:
1. A process for the preparation of metallic thorium having a purity of at least 99% comprising reacting essentially anhydrous thorium dioxide at a temperature of at least about 700° C. with a molten anhydrous calcium halide and an alkali metal in proportion such that the amount of the calcium halide is at least 200 percent in excess and the amount of the alkali metal is at least 100 percent in excess in moles of the amounts required by the equation:

$$2CaX_2 + 4M + ThO_2 \rightarrow Th + 2CaO + 4MX$$

where X is a halogen and M is an alkali metal.

2. A process for the preparation of metallic thorium having a purity of at least 99% comprising reacting essentially anhydrous thorium dioxide at a temperature between about 800 to 900° C. for a period of at least 30 minutes with essentially anhydrous calcium chloride and sodium metal in proportions such that the amount of calcium chloride is at least 200 percent in excess and the amount of sodium is at least 200 percent in excess in moles of the amounts required by the equation:

$$2CaCl_2 + 4Na + ThO_2 \rightarrow Th + 2CaO + 4NaCl$$

3. The process of claim 2 wherein the weight ratio of calcium chloride to sodium is not more than about 4 to 1.

References Cited in the file of this patent
UNITED STATES PATENTS 1,573,083     Marden et al. 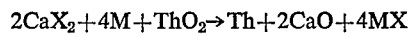 Feb. 16, 1926

FOREIGN PATENTS 238,663     Great Britain 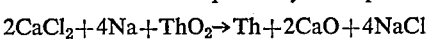 Aug. 27, 1925